United States Patent [19]
Sugimoto et al.

[11] Patent Number: 5,731,249
[45] Date of Patent: Mar. 24, 1998

[54] SPRAY-ON REFRACTORY COMPOSITION

[75] Inventors: Hiroyuki Sugimoto; Tasuku Matsuda, both of Bizen; Koichi Tanaka; Hiroshi Takenaka, both of Okayama, all of Japan

[73] Assignee: Shinagawa Refractories Co., Ltd., Tokyo, Japan

[21] Appl. No.: 732,349

[22] PCT Filed: Oct. 5, 1995

[86] PCT No.: PCT/JP95/02042

§ 371 Date: Nov. 4, 1996

§ 102(e) Date: Nov. 4, 1996

[87] PCT Pub. No.: WO96/27567

PCT Pub. Date: Sep. 12, 1996

[30] Foreign Application Priority Data

Mar. 6, 1995 [JP] Japan .................................. 7-045366

[51] Int. Cl.$^6$ ........................................... C04B 35/00
[52] U.S. Cl. ........................ 501/94; 524/59; 524/66; 524/876; 524/877; 524/904; 523/145
[58] Field of Search ..................... 501/94, 99; 524/59, 524/66, 876, 877, 904; 523/145

[56] References Cited

U.S. PATENT DOCUMENTS

| | | | |
|---|---|---|---|
| 4,102,694 | 7/1978 | Sasaki et al. | 501/99 |
| 4,427,800 | 1/1984 | Nakamura et al. | 501/94 |
| 4,501,836 | 2/1985 | Nakamura et al. | 524/66 |

*Primary Examiner*—Michael Marcheschi
*Attorney, Agent, or Firm*—Armstrong,Westerman, Hattori,McLeland & Naughton

[57] ABSTRACT

The object of the present invention is to provide a spray-on (gunning) refractory composition having high anti-stripping property, adhesive strength and corrosion resistant property suitable even for high temperature operation in steelmaking furnace. To refractory materials, resol type phenolic resin powder, being in semi-melting state at 80° C. to 500° C. and having weight average molecular weight of 1,000 to 15,000 and residual monomer of not more than 1,000 ppm, or phenol-formaldehyde resin powder, being in heat melting, self-hardening state at 100° C. to 500° C., having weight average molecular weight of 1,000 to 15,000 and residual monomer of not more than 1,000 ppm, and containing reactive methylol group by 6 to 9 weight %, said phenol-formaldehyde resin powder being added by 2 to 10 weight %, and pitch with high softening point of 100° C. to 500° C. being added by 2 to 10 weight %.

2 Claims, No Drawings

SPRAY-ON REFRACTORY COMPOSITION

This application is a 371 of international application number PCT/JP95/02042, filed Oct. 5, 1995.

FIELD OF THE INVENTION

The present invention relates to a spray-on (gunning) refractory composition used for furnace wall, furnace bottom, etc. of steelmaking facitilities such as a ladle, converter, electric furnace, and in particular, to a spray-on refractory composition having high service life, adhesive property and corrosion-resistant property.

BACKGROUND ART

In the past, as spray-on (gunning) refractory composition used for repair of a furnace wall, furnace bottom etc. of steelmaking facilities such as a converter, electric furnace, ladle, etc., a composition has been known which contains an inorganic binder such as phosphate or silicate added to refractory aggregate by 3 to 10 weight %. However, this conventional type composition is disadvantageous in that the service life is not sufficient when exposed to severe operating conditions of the steelmaking furnaces.

The disadvantages may be attributed to the facts that the inorganic binder forms substances of low melting point when heated and bonded and causes shrinkage, that the binder migrated as water is rapidly evaporated because it is used in aqueous solution and adhesive strength is reduced and the binder is separated, and further, that it is easily dissolved and service life is reduced because inorganic binder contains much liquid phase in the matrix.

Further, a refractory composition is known which is obtained by adding an inorganic binder such as phosphate or silicate by several weight % and an organic binder such as pitch, phenolic resin, etc. by 10 weight % refractory aggregate. The composition of this type is also disadvantageous in that the above problems are not solved yet because the inorganic binder exerts extensive influence on the adhesive property. Also, in case phenolic resin is used as the organic binder, it often hinders adhesive performance of the inorganic binder and the refractory composition is very likely to drop or strip off. Further, carbon generated by carbonization of the organic resin is oxidized by alkali components of the inorganic binder, and this reduces the favorable effect of carbon.

Further, another type of refractory composition is known, which is produced by adding pitch or novolak type phenolic resin to refractory aggregate, whereas this is also disadvantageous in that it flows down along high temperature furnace wall during heating and bonding, and it has no sufficient adhesive property and is not usable as a spray-on refractory composition.

There is also a castable (prepared unshaped) refractory using phenol-formaldehyde type resin. For example, Japanese Patent Publication 62-38382 discloses a method to use only powder of the above resin added to inorganic material powder as a binder, or a method to obtain a binder by combining water-soluble organic binder, auxiliary forming agent, petroleum product and its byproducts as auxiliary components for the binder. These methods are disclosed for applications as wall material fire-retardant paint, fire-retardant pad, etc. of a blast furnace, converter, etc. In case the mixture of these inorganic material powders is used as a spraying material and if only phenol-formaldehyde type resin is used for the binder, warping occurs on the portion of the facilities to be sprayed, and there is also problem in adhesive property. Also, in case it is used as auxiliary component other than pitch with high melting point, fluidity and form-keeping property are not sufficient as spraying material, and the adhesive property is lower and it runs down. When the petroleum type auxiliary component is added, adhesive property cannot be improved and warping of the portion to be sprayed is not prevented.

It is an object of the present invention to provide a spray-on (gunning) refractory composition, which is high in anti-stripping property, adhesive strength and corrosion-resistant property and is suitable for high temperature operation in steelmaking furnaces.

DISCLOSURE OF THE INVENTION

A spray-on refractory composition according to the first aspect of the present invention comprises a resol type phenolic resin powder being in a semi-melting state at 80° C. to 500° C., having a weight average molecular weight of 1,000 to 15,000 and residual monomer of not more than 1,000 ppm, said resin powder being added by 2 to 10 weight % to refractory materials and a pitch having high softening point of 100° C. to 500° C. being added by 2 to 10 weight %.

A spray-on refractory composition according to the second aspect of the invention comprises a phenol-formaldehyde resin powder, being in a heat melting and self-hardening state at 100° C. to 500° C., having a weight average molecular weight of 1,000 to 15,000 and residual monomer of not more than 1,000 ppm and containing reactive methylol group by 6 to 9 weight %, said resin powder being added by 2 to 10 weight % and a pitch having high softening point of 100° C. to 500° C. being added by 2 to 10 weight %.

In the spray-on refractory composition of the present invention, the water-insoluble resol type phenolic resin powder in semi-melting state at 80° C. to 500° C. or the heat melting, self-hardening phenol-formaldehyde type resin powder is used as a bonding component. As a result, it is possible to have satisfactory adhesive property during heating and bonding. By adding the pitch with high softening point to prevent stripping of the portion to be sprayed after bonding, it is possible to obtain a refractory composition having high anti-stripping property, adhesive strength and corrosion resistant property suitable for high temperature operation in a steelmaking furnace.

BEST MODE FOR CARRYING OUT THE INVENTION

As the refractory materials used in the present invention, refractory materials commonly used can be used, e.g. fused alumina, sintered alumina, sintered mullite, calcia partially stabilized zirconia, yttria partially stabilized zirconia, chamotte, silicon carbide, or a mixture of these substances may be used. In particular, it is preferable to use MgO or MgO-CaO type aggregate with particle size adjusted and graded to 4 mm or less, e.g. basic aggregate such as electrofused magnesia, sintered magnesia clinker, natural magnesia clinker, natural dolomite clinker, synthetic dolomite clinker, etc.

The resol type phenolic resin powder used in the first spray-on refractory composition of the present invention is insoluble or hardly soluble in water and is in a semi-melting state at 80° C. to 500° C., or more preferably at 80° C. to 200° C. "Semi-melting state" means a state in which the material is softened and exhibits adhesive property but is not perfectly molten. If the material is perfectly molten at temperature lower than 500° C., it is not desirable because the material may be fluidized and flow down during heating and bonding when it is sprayed on a vertical wall or the like. Also, the material softened at 500° C. or higher temperature exhibits no adhesive property in the temperature range where the adhesive property is required, and the material cannot fulfill the function as a binder.

Weight average molecular weight of the resol type phenolic resin is 1,000 to 15,000, or more preferably 1,000 to 10,000. In case of a novolak type phenolic resin having weight average molecular weight of less than 1,000 (weight average molecular weight of 300 to 800) or a resol type phenolic resin having weight average molecular weight of 200 to 700, the material is perfectly molten at 100° C. or at lower temperature and is fluidized. It flows down during heating and bonding, and it is not desirable as the spray-on refractory composition.

In the second spray-on refractory composition of the present invention, a heat melting and self-hardening type phenol-formaldehyde resin powder is used, which is insoluble or hardly soluble in water and contains reactive methylol groups by 6 to 9 weight %, or more preferably by 8 to 9 weight %, is molten at 100° C. to 500° C., or more preferably at 100° C. to 200° C. and shows gelating (self-hardening) property. If it contains the methylol groups by more than 9 weight %, reactivity becomes too high, and the gelated hardened material becomes fragile, and this causes problems in the adhesive strength or the mechanical strength of the portion to be sprayed. If it is less than 6 weight %, the material has poor reactivity for gelation, and this causes problems in the adhesive property and strength of the portion to be sprayed. A material molten at temperature of more than 500° C. has poor adhesive property in the temperature range where adhesive property is required, and it does not fulfill the function as a binder.

In the heat melting, self-hardening phenol-formaldehyde type resin powder as described above, the weight average molecular weight is 1,000 to 15,000, or more preferably, 3,000 to 15,000. If the weight average molecular weight is less than 1,000, content of the methylol groups becomes higher, and this causes reactivity to be too high, and the gelated hardened material becomes fragile. This is not desirable as a spray-on refractory composition.

The resol type phenolic resin powder and the heat melting, self-hardening type phenol-formaldehyde resin powder contains residual monomer of not more than 1,000 ppm, or more preferably not more than 500 ppm. If the residual monomer is contained by more than 1,000 ppm, extreme foaming occurs during heating and bonding. As a result, the texture of the sprayed portion becomes poor, state, and adhesive strength is extensively reduced.

The resol type phenolic resin powder has average particle size of 15 to 20 μm. As commercially available products, there are, for example, PR-Q-731, PR-Q-731V, etc. produced by Sumitomo Durez Co., Ltd.

The heat melting, self-hardening type phenol-formaldehyde resin powder has an average particle size of 15 to 20 μm. As commercially available products, there are, for example, "BELPEARL" S-870, S-890, S-895, etc. manufactured by Kanebo Ltd.

The resol type phenolic resin powder or the heat melting, self-hardening type phenol-formaldehyde resin powder is added by 2 to 10 weight % or more preferably, by 3 to 7 weight %, to refractory aggregate. If the resin powder is added by less than 2 weight %, the adhesive property is low and trouble occurs when the spray-on refractory composition is applied on a vertical wall. If it is added by more than 10 weight %, porosity becomes too high. This reduces corrosion-resistant property and is not very economical.

When the resol type phenolic resin powder or heat melting, self-hardening type phenol-formaldehyde resin powder is used alone in the spray-on refractory composition, warping occurs on the sprayed portion after bonding and the material may be stripped off. To overcome this problem, the pitch with a high softening point is added. Its softening point (SP) is preferably 100° C. to 500° C., or more preferably 120° C. to 400° C. If the softening point of the pitch is higher than 500° C., expansibility is lost because there remain almost no volatile components, and the effect to prevent warping of the sprayed portion after bonding is not obtained.

The pitch with high softening point is added to refractory aggregate by 2 to 10 weight %, or more preferably by 3 to 7 weight %. The ratio of the high softening point pitch to the resol type phenolic resin powder or the heat melting, self-hardening type phenol-formaldehyde resin powder is preferably 70/30 to 30/70 in weight ratio. If the ratio of the pitch with high softening point to the resol type phenolic resin powder or the heat melting self-hardening type phenol-formaldehyde resin powder is more than 70/30, the material may flow down along a vertical wall during heating and bonding, and the bonding ratio is reduced. If it is lower than 30/70, shrinkage of the resol type phenolic resin powder or the heat melting, self-hardening type phenol-formaldehyde resin powder overcomes the expansion effect obtained by the pitch with high softening point. As a result, warping of the sprayed portion occurs due to the shrinkage, and the material is often stripped off.

In addition to the above components, other components such as plasticizer, metal powder, and when necessary, a small amount of additive such as deflocculating agent and fibers are added to the spray-on refractory composition of the present invention.

The plasticizer is added to improve the bonding ratio. For example, silica flour, clay, sepiolite, bentonite, calcium hydroxide, etc. may be used. It is added by 0.5 to 3 weight %, or more preferably by 0.5 to 2 weight %, to the refractory aggregate.

Metal powder is added to improve strength and to prevent oxidation of carbon as caused by the resol type phonolic resin powder or the heat melting, self-hardening type phenol-formaldehyde resin powder and the pitch with high softening point. For example, powder of aluminum, silicon, aluminum-magnesium alloy, etc. may be used as the metal powder, and it is added to the refractory aggregate by 0 to 5 weight %, or more preferably, by 0 to 3 weight %. If it is higher than 5 weight %, it is not desirable because texture of the sprayed portion becomes too porous.

The deflocculating agent is added when necessary to improve denseness of the texture of the sprayed portion. For example, an inorganic deflocculating agent such as sodium hexametaphosphate, sodium silicate, etc., or organic deflocculating agents such as sodium polyalkylallyl sulfonate, polyacrylic acid salt, etc. may be used, and it is added to the refractory aggregate by 0 to 1 weight %, or more preferably by 0 to 0.5 weight %.

Fibers are added when necessary for preventing the running of the spray slurry along a vertical wall. For example, inorganic fibers such as alumina fibers, carbon fibers, natural fibers such as hemp, or organic fibers such as organic synthetic fibers may be used, and the fibers are added to the refractory aggregate by 0 to 0.2 weight %, or more preferably by 0 to 0.1 weight %.

After water is added to the mixture of the above components of the spray-on refractory composition of the present invention, it is sprayed to a furnace wall, furnace bottom, etc. of the steelmaking facilities by normal procedure, and it is then heated and hardened.

[EXAMPLES 1 TO 18 AND COMPARATIVE EXAMPLES 1 to 6]

To the aggregates having weight ratios as shown in the following Tables 1 to 4, the additives were added by weight ratios shown in the same Tables 1 to 4, and the spray-on refractory compositions of the present invention (1 to 18) were prepared.

Also, to the aggregates of weight ratios shown in Tables 4 and 5, the additives were blended by weight ratios shown in the same Tables 4 and 5, and the spray-on refractory compositions for comparison (Comparative Examples 1 to 6) were prepared.

To each of the spray-on refractory compositions, water was added by 22 to 24 weight %, and this was sprayed on a panel in an experimental furnace kept at 1,000° C.

Bonding ratio (%) of the spray material, adhesive strength (MPa), apparent porosity (%), the results of slag test at 1750° C. for 3 hours, and the results of the actual furnace test using 250-ton converter (the results of longevity test for high temperature tapping at 1700° C.) are shown in Tables 1 to 5. In the results of the slag test, it is shown that, the smaller the index is, the more satisfactory the corrosion resistance is. In the results of actual furnace test, it is shown that, the higher the index is, the higher the longevity is.

Physical properties of "BELPEARL" S-890 and S-895 used in the above examples were as follows:

| "BELPEAR" S-890 | |
|---|---|
| Weight average molecular weight: | 10,000 |
| Softening temperature: | 100° C. |
| Residual monomer: | 300 ppm |
| Average particle size: | 15 to 20 μm |
| "BELPEAR" S-895 | |
| Weight average molecular weight: | 6,000 |
| Softening temperature: | 100° C. |
| Residual monomer: | 500 ppm |
| Average particle size: | 15 to 20 μm |

TABLE 1

| | | 1 | 2 | 3 | 4 | 5 |
|---|---|---|---|---|---|---|
| Aggregate | | 30 | 30 | 30 | 30 | 30 |
| Seawater MgO 95% (particle size) | 4 to 1.5 mm | 30 | 30 | 30 | 30 | 30 |
| | 1.5 to 0.3 | 40 | 40 | 40 | 40 | 40 |
| | −0.3 | — | — | — | — | — |
| Synthetic dolomite (particle size) | 4 to 1.5 mm | — | — | — | — | — |
| | 1.5 to 0.3 | | | | | |
| Additive | | | | | | |
| Special phenolic resin | BELPEARL S890 | 3 | — | — | — | — |
| | S895 | — | 5 | — | 8 | 4 |
| | S870 | — | — | 6 | — | 1 |
| | PR-Q-731 | — | — | — | — | — |
| | PR-Q-731V | — | — | — | — | — |
| Pitch with high softening point | Softening point 150° C. | 7 | — | — | 2 | — |
| | 180° C. | — | 5 | — | — | — |
| | 220° C. | — | — | 4 | — | 5 |
| | 350° C. | — | — | — | — | — |
| Plasticizer | Silica flour | 1 | — | 1 | — | — |
| | Clay | 1 | — | — | 1 | — |
| | Sepiolite | — | 2 | 1 | 1 | 2 |
| | Ca(OH)$_2$ | — | — | — | — | — |
| Metal powder | Al | — | 1 | — | 2 | 3 |
| | SI | — | — | 1 | — | — |
| Deflocculating agent | Sodium hexamethaphosphate | 0.1 | — | — | 0.05 | — |
| | Sodium silicate | — | 0.1 | 0.3 | — | 0.5 |
| Results of laboratory test | | | | | | |
| Bonding ratio (%) | | 80 | 85 | 85 | 90 | 85 |
| Adhesive strength (MPa) | | 0.25 | 0.30 | 0.30 | 0.20 | 0.35 |
| Apparent porosity (%) | | 30 | 29 | 30 | 30 | 30 |
| Corrosion resistance index | | 100 | 95 | 90 | 80 | 100 |
| Results of actual furnace test Longevity to high temperature tapping at 1700° C. | | 4 | 5 | 5 | 5 | 4 |

TABLE 2

| | | 6 | 7 | 8 | 9 | 10 |
|---|---|---|---|---|---|---|
| Aggregate | | | | | | |
| Seawater MgO 95% (particle size) | 4 to 1.5 mm | — | 30 | 30 | 30 | 30 |
| | 1.5 to 0.3 | 10 | 30 | 30 | 30 | 30 |
| | −0.3 | 30 | 40 | 40 | 40 | 40 |

TABLE 2-continued

|  |  | 6 | 7 | 8 | 9 | 10 |
|---|---|---|---|---|---|---|
| Synthetic dolomite (particle size) | 4 to 1.5 mm | 40 | — | — | — | — |
|  | 1.5 to 0.3 | 20 | — | — | — | — |
| Additive |  |  |  |  |  |  |
| Special phenolic resin | BELPEARL S890 | 2 | — | — | — | — |
|  | S895 | 3 | — | — | — | — |
|  | S870 | — | — | — | — | — |
|  | PR-Q-731 | — | 5 | — | 2 | 3 |
|  | PR-Q-731V | — | — | 5 | — | — |
| Pitch with high softening point | Softening point 150° C. | — | 5 | — | — | — |
|  | 180° C. | — | — | 5 | — | — |
|  | 220° C. | — | — | — | 4 | 5 |
|  | 350° C. | — | — | — | — | — |
| Plasticizer | Silica flour | — | 1 | — | 1 | — |
|  | Clay | — | 1 | — | — | 1 |
|  | Sepiolite | 2 | — | 2 | 1 | 1 |
|  | Ca(OH)$_2$ | — | — | — | — | — |
| Metal powder | Al | — | — | 1 | — | 2 |
|  | SI | 0.5 | — | — | 1 | — |
| Deflocculating agent | Sodium hexametaphosphate | 0.1 | 0.1 | — | — | 0.05 |
|  | Sodium silicate | — | — | 0.1 | 0.3 | — |
| Results of laboratory test |  |  |  |  |  |  |
| Bonding ratio (%) |  | 85 | 85 | 85 | 70 | 75 |
| Adhesive strength (MPa) |  | 0.35 | 0.35 | 0.35 | 0.25 | 0.25 |
| Apparent porosity (%) |  | 30 | 29 | 30 | 30 | 30 |
| Corrosion resistance index |  | 100 | 100 | 100 | 90 | 95 |
| Results of actual furnace test |  | 4 | 4 | 4 | 5 | 5 |
| Longevity to high temperature tapping at 1700° C. |  |  |  |  |  |  |

TABLE 3

|  |  | 11 | 12 | 13 | 14 | 15 |
|---|---|---|---|---|---|---|
| Aggregate |  |  |  |  |  |  |
| Seawater MgO 95% (particle size) | 4 to 1.5 mm | 30 | 30 | — | — | 30 |
|  | 1.5 to 0.3 | 30 | 30 | 10 | 10 | 30 |
|  | −0.3 | 40 | 40 | 30 | 30 | 40 |
| Synthetic dolomite (particle size) | 4 to 1.5 mm | — | — | 40 | 40 | — |
|  | 1.5 to 0.3 | — | — | 20 | 20 | — |
| Additive |  |  |  |  |  |  |
| Special phenolic resin | BELPEARL S890 | 4 | — | — | — | 3 |
|  | S895 | — | 3 | — | — | — |
|  | S870 | — | — | — | — | — |
|  | PR-Q-731 | — | — | 5 | — | — |
|  | PR-Q-731V | — | — | — | 5 | — |
| Pitch with high softening point | Softening point 150° C. | — | — | — | — | 3 |
|  | 80° C. | — | — | — | — | — |
|  | 220° C. | — | 7 | — | 6 | — |
|  | 350° C. | 5 | — | 7 | — | — |
| Plasticizer | Silica flour | 3 | 1 | 1 | — | 3 |
|  | Clay | — | — | 1 | — | — |
|  | Sepiolite | — | 1 | — | 6 | — |
|  | Ca(OH)$_2$ | — | — | — | — | — |
| Metal powder | Al | — | — | — | 1 | — |
|  | SI | 2 | 2 | 1 | — | 2 |
| Deflocculating agent | Sodium hexamethaphosphate | — | — | 0.05 | — | — |
|  | Sodium silicate | — | — | — | — | — |
| Results of laboratory test |  |  |  |  |  |  |
| Bonding ratio (%) |  | 90 | 85 | 90 | 85 | 90 |
| Adhesive strength (MPa) |  | 0.35 | 0.35 | 0.35 | 0.35 | 0.30 |
| Apparent porosity (%) |  | 29 | 30 | 30 | 30 | 30 |

TABLE 3-continued

|  | 11 | 12 | 13 | 14 | 15 |
|---|---|---|---|---|---|
| Corrosion resistance index | 80 | 85 | 95 | 100 | 90 |
| Results of actual furnace test Longevity to high temperature tapping at 1700° C. | 6 | 5 | 5 | 4 | 5 |

TABLE 4

|  |  | 16 | 17 | 18 | Comp. Ex. 1 | Comp. Ex. 2 |
|---|---|---|---|---|---|---|
| Aggregate |  |  |  |  |  |  |
| Seawater MgO 95% (particle size) | 4 to 1.5 mm | 30 | 30 | 30 | 30 | 30 |
|  | 1.5 to 0.3 | 30 | 30 | 30 | 30 | 30 |
|  | −0.3 | 40 | 40 | 40 | 40 | 40 |
| Synthetic dolomite (particle size) | 4 to 1.5 mm | — | — | — | — | — |
|  | 1.5 to 0.3 | — | — | — | — | — |
| Additive |  |  |  |  |  |  |
| Special phenolic resin | BELPEARL S890 | — | — | — | — | 5 |
|  | S895 | 4 | — | 5 | — | — |
|  | S870 | — | 7 | — | — | — |
|  | PR-Q-731 | — | — | — | — | — |
|  | PR-Q-731V | — | — | — | — | — |
| Pitch with high softening point | Softening point 150° C. | — | — | — | — | — |
|  | 180° C. | 4 | 5 | — | — | — |
|  | 220° C. | — | — | — | 5 | — |
|  | 350° C. | — | — | 5 | — | — |
| Plasticizer | Silica flour | — | 1 | 3 | — | — |
|  | Clay | 2 | 2 | — | — | — |
|  | Sepiolite | — | — | — | 2 | 2 |
|  | Ca(OH)₂ | — | — | — | — | — |
| Metal powder | Al | 1 | 1 | — | 3 | 1 |
|  | SI | — | 1 | 2 | — | 2 |
| Deflocculating agent | Sodium hexamethaphosphate | — | — | — | 0.1 | — |
|  | Sodium silicate | — | 0.05 | — | 5 | — |
| Results of laboratory test |  |  |  |  |  |  |
| Bonding ratio (%) |  | 90 | 90 | 90 | 80 | 65 |
| Adhesive strength (MPa) |  | 0.35 | 0.35 | 0.35 | 0.01 | 0.05 |
| Apparent porosity (%) |  | 30 | 29 | 29 | 34 | 30 |
| Corrosion resistance index |  | 90 | 85 | 80 | 120 | 110 |
| Results of actual furnace test Longevity to high temperature tapping at 1700° C. |  | 5 | 6 | 6 | 1 | 1 |

TABLE 5

|  |  | Comp. Ex. 3 | Comp. Ex. 4 | Comp. Ex. 5 | Comp. Ex. 6 |
|---|---|---|---|---|---|
| Aggregate |  |  |  |  |  |
| Seawater MgO 95% (particle size) | 4 to 1.5 mm | 30 | 30 | — | — |
|  | 1.5 to 0.3 | 30 | 30 | 10 | 10 |
|  | −0.3 | 40 | 40 | 30 | 30 |
| Synthetic dolomite (particle size) | 4 to 1.5 mm | — | — | 40 | 40 |
|  | 1.5 to 0.3 | — | — | 20 | 20 |
| Additive |  |  |  |  |  |
| Special phenolic resin | BELPEARL S890 | — | — | — | — |
|  | S895 | 5 | — | — | — |
|  | S870 | — | 7 | — | — |
|  | PR-Q-731 | — | — | — | — |
|  | PR-Q-731V | — | — | — | — |
| Pitch with | Softening point 150° C. | — | — | 3 | 3 |

TABLE 5-continued

|  |  | Comp. Ex. 3 | Comp. Ex. 4 | Comp. Ex. 5 | Comp. Ex. 6 |
|---|---|---|---|---|---|
| high softening point | 180° C. | — | — | — | — |
|  | 220° C. | — | — | — | — |
|  | 350° C. | — | — | — | 3 |
| Plasticizer | Silica flour | 3 | — | — | — |
|  | Clay | — | 2 | — | — |
|  | Sepiolite | — | — | — | — |
|  | Ca(OH)$_2$ | — | — | 2 | 2 |
| Metal powder | Al | — | 3 | — | — |
|  | SI | 3 | — | — | 2 |
| Deflocculating agent | Sodium hexamethaphosphate | — | — | 5 | 5 |
|  | Sodium silicate | — | 0.05 | — | — |
| Results of laboratory test |  |  |  |  |  |
| Bonding ratio (%) |  | 55 | 45 | 80 | 80 |
| Adhesive strength (MPa) |  | 0.03 | 0.03 | 0.02 | 0.05 |
| Apparent porosity (%) |  | 30 | 33 | 35 | 34 |
| Corrosion resistance index |  | 110 | 120 | 120 | 115 |
| Results of actual furnace test Longevity to high temperature tapping at 1700° C. |  | 1 | 1 | 1 | 1 |

INDUSTRIAL APPLICABILITY

The spray-on refractory composition of the present invention is high in adhesive strength and is very unlikely to be stripped off from the bonded surface. Slag penetration is shallow, and high temperature volume stability is high. Stripping of the material from intermediate layer and damage rarely occurs. Compared with the conventional type spray-on (gunning) refractory material, service life of the spray-on refractory composition of the present invention is by 3 to 5 times longer in case of ordinary type of steel. Service life is also long enough in case of steel of high temperature tapping at 1700° C. or more. Accordingly, the spray-on refractory composition of the present invention is suitable for applications on a furnace wall, furnace bottom, etc. of the steelmaking facilities such as a converter, electric furnace, ladle, etc.

What we claim is:

1. A spray-on refractory composition, comprising (a) refractory materials, (b) 2–10 weight % of a resol phenolic resin powder, said resin powder being insoluble or substantially insoluble in water, in semi-melting state at 80° C. to 500° C. and having a weight average molecular weight of 1,000 to 15,000 and a residual monomer content of not more than 1,000 ppm, (c) 2–10 weight % of a pitch with a softening temperature of 100° C. to 500° C., and (d) water.

2. A spray-on refractory composition, comprising (a) refractory materials, (b) 2–10 weight % of a phenol-formaldehyde resin powder said resin powder being insoluble or substantially insoluble in water, having a self-hardening property, being molten at 100° C. to 500° C., having a weight average molecular weight of 1,000 to 15,000 and a residual monomer content of not more than 1,000 ppm, and containing reactive methylol group in an amount of 6 to 9 weight % (c) 2–10 weight % of a pitch with a softening point of 100° C. to 500 ° C. and (d) water.

* * * * *